United States Patent
Park et al.

(10) Patent No.: US 9,231,931 B2
(45) Date of Patent: Jan. 5, 2016

(54) METHOD AND APPARATUS OF CONSTRUCTING SECURE INFRA-STRUCTURE FOR USING EMBEDDED UNIVERSAL INTEGRATED CIRCUIT CARD

(71) Applicants: Chul Hyun Park, Seoul (KR); Kwan Lae Kim, Seoul (KR); Jin Hyoung Lee, Seoul (KR); Joo Young Kim, Seoul (KR)

(72) Inventors: Chul Hyun Park, Seoul (KR); Kwan Lae Kim, Seoul (KR); Jin Hyoung Lee, Seoul (KR); Joo Young Kim, Seoul (KR)

(73) Assignee: KT Corporation, Seongnam-si (KR)

( * ) Notice: Subject to any disclaimer, the term of this patent is extended or adjusted under 35 U.S.C. 154(b) by 51 days.

(21) Appl. No.: 13/901,126

(22) Filed: May 23, 2013

(65) Prior Publication Data

US 2013/0340040 A1 Dec. 19, 2013

(30) Foreign Application Priority Data

May 23, 2012 (KR) .................. 10-2012-0055054
May 22, 2013 (KR) .................. 10-2013-0057578

(51) Int. Cl.
*H04L 29/06* (2006.01)
*G06F 21/77* (2013.01)

(52) U.S. Cl.
CPC ............ *H04L 63/08* (2013.01); *H04L 63/0428* (2013.01); *H04L 63/0823* (2013.01); *H04L 63/12* (2013.01); *H04L 63/166* (2013.01); *G06F 21/77* (2013.01); *H04L 63/0853* (2013.01)

(58) Field of Classification Search
CPC .. G06F 21/53; H04L 63/0823; H04L 63/0853
USPC ............................................. 726/3
See application file for complete search history.

(56) References Cited

U.S. PATENT DOCUMENTS

| | | | |
|---|---|---|---|
| 2008/0065883 A1* | 3/2008 | Zeng et al. .................... | 713/168 |
| 2009/0313472 A1 | 12/2009 | Guccione et al. | |
| 2012/0108205 A1* | 5/2012 | Schell et al. ................... | 455/411 |
| 2013/0029588 A1* | 1/2013 | Bienas et al. ..................... | 455/7 |
| 2013/0122864 A1* | 5/2013 | Haggerty et al. ............. | 455/411 |
| 2013/0166899 A1* | 6/2013 | Courtney et al. ............. | 713/100 |

FOREIGN PATENT DOCUMENTS

KR 10-2009-0129612 A 12/2009

* cited by examiner

*Primary Examiner* — Izunna Okeke
*Assistant Examiner* — Bryan Wright
(74) *Attorney, Agent, or Firm* — Sughrue Mion, PLLC

(57) ABSTRACT

Provided are a method and device for building a security-based environment that uses an eUICC. A method of building a trust relationship in an eUICC environment includes transmitting, by a trust requesting object, a trust relationship requesting message including identification information and signature information of the trust requesting object to a trust verifying object, delivering, by the trust verifying object, the trust relationship requesting message to a trust relationship relay object and receiving trust information of the trust requesting object corresponding to the trust relationship requesting message from the trust relationship relay object, and verifying, by the trust verifying object, the signature information of the trust requesting object using the trust information of the trust requesting object.

18 Claims, 6 Drawing Sheets

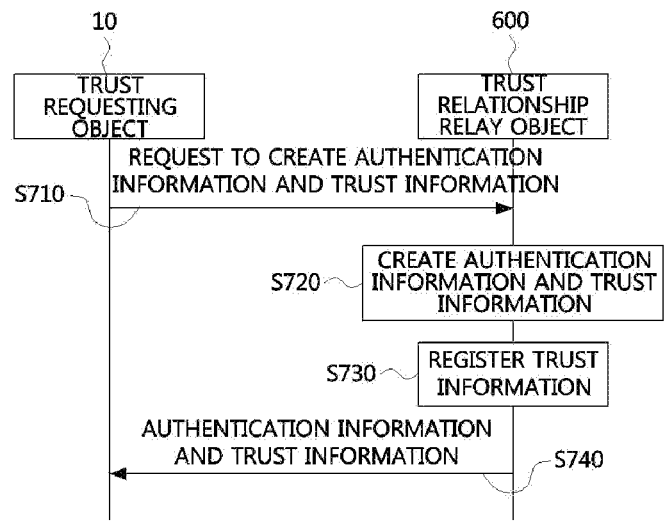
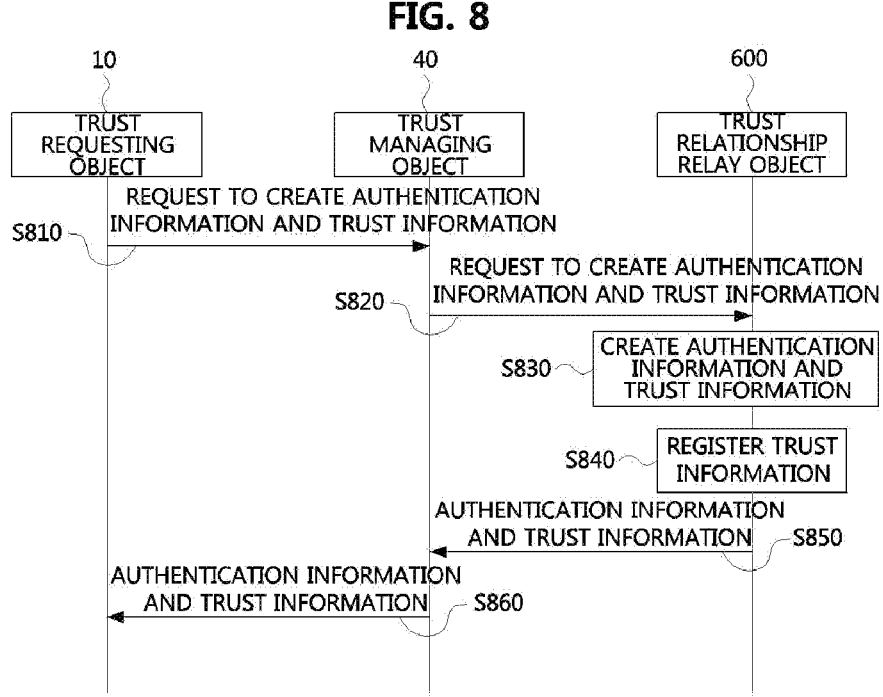

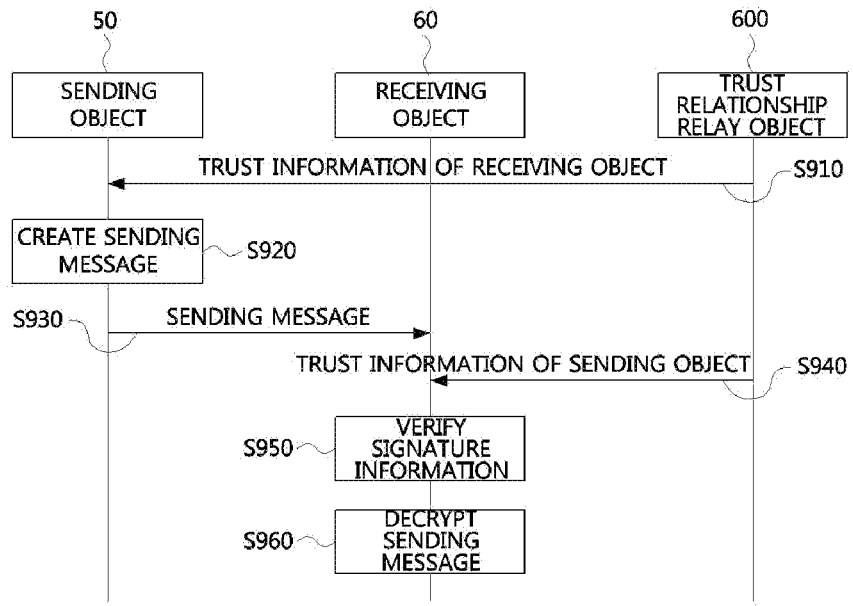
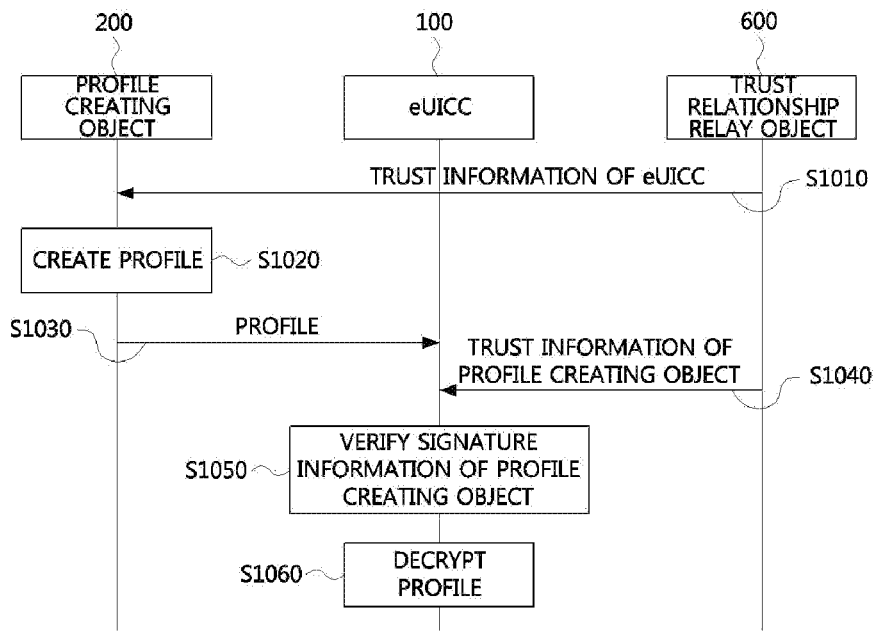

METHOD AND APPARATUS OF CONSTRUCTING SECURE INFRA-STRUCTURE FOR USING EMBEDDED UNIVERSAL INTEGRATED CIRCUIT CARD

CLAIM FOR PRIORITY

This application claims priority to Korean Patent Application No. 10-2012-0055054 filed on May 23, 2012, and No. 10-2013-0057578 filed on May 22, 2012, in the Korean Intellectual Property Office (KIPO), the entire contents of which are hereby incorporated by reference.

BACKGROUND

1. Technical Field

Example embodiments of the present invention relate to building an environment that uses an eUICC, and more specifically, to a method and device for building a security-based environment that uses an eUICC.

2. Related Art

A universal integrated circuit card (UICC) is a smart card that is inserted into a terminal and used as a module for user authentication. The UICC may store a user's personal information and carrier information about a mobile carrier to which the user subscribes. For example, the UICC may include an international mobile subscriber identity (IMSI) to identify the user.

The UICC is called as a subscriber identity module (SIM) card in a global system for mobile communications (GSM) method, and a universal subscriber identity module (USIM) card in a wideband code division multiple access (WCDMA) method.

When the user installs the UICC in the user's terminal, user authentication is automatically performed using information stored in the UICC so that the user may conveniently use the terminal. When the user replaces the terminal, the user may detach the UICC from the old terminal and reinstall it in a new terminal, to easily replace the terminal.

Meanwhile, it is difficult to downsize a terminal which requires a compact size, for example, a terminal for machine-to-machine (M2M) communication, when the terminal is manufactured to have a detachable UICC. Therefore, an embedded UICC (eUICC) structure that is a non-detachable UICC has been proposed.

Since an existing UICC is detachable from the terminal, the user may activate the terminal regardless of a type of the terminal or a mobile carrier. However, a UICC that is embedded when a terminal is manufactured may include an international mobile subscriber identity (IMSI) in the eUICC when it is assumed that the UICC is used for only a specific mobile carrier. In order to, for example, order, activate, and terminate the terminal, the eUICC needs information (for example, an IMSI) on a user of the corresponding UICC through, for example, downloading.

That is, in the eUICC that is integrally installed in the terminal, the UICC is installed in the terminal when the terminal is manufactured and released, unlike the existing detachable UICC. Due to its non-detachable physical structure, it is necessary to download from an external location and install in the eUICC a network operator authentication key (K), a UICC data file (a network access file, an international mobile subscriber identity (IMSI), a home public land mobile network (HPLMN), etc.), a user information file (for example, a short message service (SMS) file, a phonebook, etc.), and an applet, etc.

In this process, it is necessary to support a function provided by the conventional UICC technology and an equal or higher level of security than the conventional UICC.

In an environment that uses conventional UICC (SIM) technology, the UICC is manufactured by a UICC manufacturer through an order from a mobile network operator (MNO). In this case, the MNO and the UICC authenticate by sharing predefined unique information (for example, an IMSI, K, or OTA Key), securely transmit and receive data based on the authentication information, and perform an operation through a permission check based on the authentication information.

However, in an environment that uses the eUICC, in general, the MNO and the eUICC may not share any data in advance. Moreover, in the environment that uses the eUICC, a function of the existing MNO is subdivided into several functions and managed remotely. That is, according to a request from subdivided components (for example, user information file download, or applet download), it is necessary to perform authentication (identification) for the component, data is securely transmitted to or received from the component, permission for the component is checked, and a corresponding operation is performed.

SUMMARY

Accordingly, example embodiments of the present invention are provided to substantially obviate one or more problems due to limitations and disadvantages of the related art.

Example embodiments of the present invention provide a method of building a trust relationship among a plurality of objects in an environment that uses an eUICC.

Example embodiments of the present invention also provide a method of building a secure link among the plurality of objects in the environment that uses the eUICC.

Example embodiments of the present invention also provide an eUICC that is appropriate to build a security-based environment that uses the eUICC.

In some example embodiments, a method of building a trust relationship in an eUICC environment includes transmitting, by a trust requesting object, a trust relationship requesting message including identification information and signature information of the trust requesting object to a trust verifying object, delivering, by the trust verifying object, the trust relationship requesting message to a trust relationship relay object and receiving trust information of the trust requesting object corresponding to the trust relationship requesting message from the trust relationship relay object, and verifying, by the trust verifying object, the signature information of the trust requesting object using the trust information of the trust requesting object.

The method of building the trust relationship in the eUICC environment may further include transmitting, by the trust verifying object, a verification result of the signature information of the trust requesting object to the trust requesting object.

The trust requesting object may be an eUICC and the trust verifying object may be a mobile network operator (MNO).

The trust requesting object and the trust verifying object may be any one of an eUICC, an MNO, a profile creating object, and a profile loading object.

The trust relationship relay object may be a certificate authority.

The trust requesting object may create authentication information and trust information of the trust requesting object, and transmit the information to the trust relationship relay object.

The trust requesting object may transmit identification information of the trust requesting object to the trust relationship relay object, and the trust relationship relay object may create authentication information and trust information of the trust requesting object using the identification information of the trust requesting object.

In other example embodiments, a method of building a secure link in an eUICC environment includes transmitting, by a sending object, a sending message, which is encrypted using trust information of a receiving object and includes signature information of the sending object, to the receiving object, verifying, by the receiving object, the signature information of the sending object included in the sending message using trust information of the sending object, and decrypting, by the receiving object, the verified sending message using authentication information of the receiving object.

In still other example embodiments, a method of building a secure link in an eUICC environment includes transmitting, by a requesting object, a link creation message including signature information based on authentication information of the requesting object to a responding object, verifying, by the responding object, the signature information based on the authentication information of the requesting object using trust information of the requesting object, and delivering, by the responding object, an encrypted shared-key created using the trust information of the requesting object to the responding object.

In still other example embodiments, an eUICC includes a trust information storage configured to store trust information of at least one object, a trust information requesting unit configured to query the trust information based on identification information of at least one object, and a trust information manager configured to search for the trust information corresponding to the identification information of at least one object in the trust information storage in response to a request from the trust information requesting unit.

According to the above-described embodiments of the invention, it is possible to securely support a function provided in an existing UICC environment and provide an equal or higher level of security than the existing UICC environment.

Furthermore, it is possible to expect a flexible authentication structure between components by building a trust relationship using authentication information.

In addition, it is possible to create a secure end-to-end link of components using a secure link building method that uses authentication information and trust information. Accordingly, it is possible to maintain a high level of security even if a configuration of the environment that uses the eUICC changes.

Moreover, in order to operate efficiently, it is possible for a variety of components (for example, a profile creating object, a profile loading object, or an MNO) including the eUICC to efficiently utilize trust information of an associated component by proposing an additional function for the eUICC.

BRIEF DESCRIPTION OF DRAWINGS

Example embodiments of the present invention will become more apparent by describing in detail example embodiments of the present invention with reference to the accompanying drawings, in which:

FIG. 7 is a sequence diagram illustrating creation and processing of authentication information and trust information according to another embodiment of the invention.

FIG. 8 is a sequence diagram illustrating creation and processing of authentication information and trust information according to still another embodiment of the invention.

FIG. 9 is a sequence diagram illustrating a method of building a secure link according to the embodiment of the invention.

FIG. 10 is a sequence diagram illustrating in further detail the method of building the secure link according to the embodiment of the invention.

DESCRIPTION OF EXAMPLE EMBODIMENTS

Figure 1:
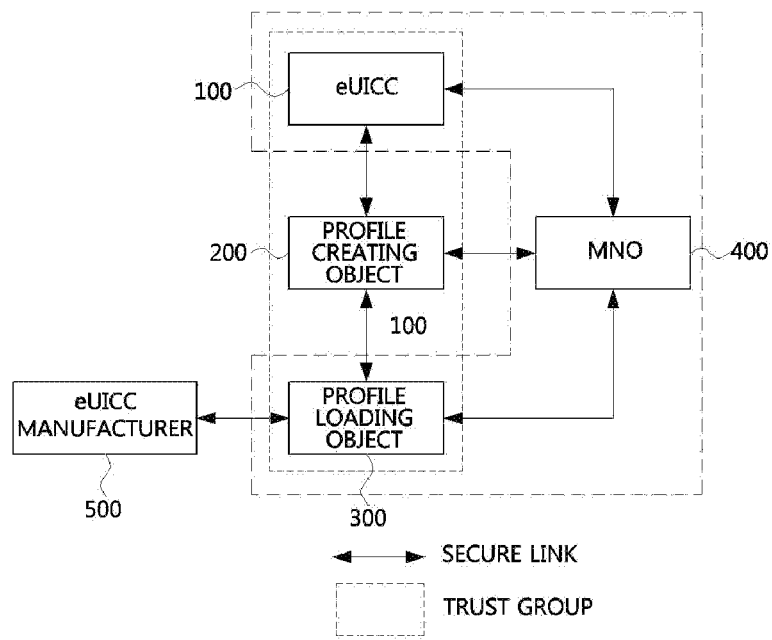
FIG. 1 is a conceptual diagram illustrating a trust group and a secure link which are required in an environment that uses an eUICC.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

An embodiment of the invention relates to building a safe operating environment of an eUICC 100 and providing an environment capable of securely supporting a function provided in an existing UICC. That is, the invention may support an equal or higher level of security function than an existing UICC supporting environment.

First, the terminology used herein is briefly described below.

An object (entity) is a component configuring the environment that uses the eUICC 100, and may refer to, for example, the eUICC 100, a mobile network operator (MNO) 400, a profile creating object 200, or a profile loading object 300.

A trust group may be a set of relationships that have been identified by performing identification between objects. A trust relationship may represent a relationship between objects that have been identified.

A secure link may refer to communication in which confidentiality and integrity are secured between objects.

The object holds authentication information to authenticate its identity, and may write a signature using the authentication information. The signature proves the fact that the object described as a writer wrote the written message (data), the written message is not fabricated or falsified in transmitting and receiving processes. The purpose of the signature is so that the fact that the object wrote the electronic document may not be denied later. For example, the signature may use signature verification using public-key encryption and may be represented as signature information.

When an encrypted message is received, the object may decrypt the message using the authentication information. For example, the authentication information may be an ID or a private key.

Trust information may be obtained through a trust relationship relay object 600. The signature of the object may be verified using the trust information. The trust relationship relay object 600 may refer to a certificate authority.

Message or data may be encrypted using the trust information of the object. In this case, the encrypted message may be decrypted using the authentication information of the object who is a subject of the trust information. For example, the trust information may be a public key.

Hereinafter, exemplary embodiments of the invention will be described in detail with reference to the accompanying drawings.

FIG. 1 is a conceptual diagram illustrating a trust group and a secure link which are required in an environment that uses the eUICC 100.

As illustrated in FIG. 1, a variety of trust groups and secure links may be set among components in the environment that uses the eUICC 100.

In FIG. 1, the profile loading object 300 may be an object that delivers a profile to the eUICC 100. For example, the profile loading object 300 may perform a subscription manager-secure routing (SM-SR) function.

The profile creating object 200 may create a profile to be delivered to the eUICC 100. For example, the profile creating object 200 may perform a subscription manager-data preparation (SM-DP) function.

More specifically, it may be required to make a trust group among the eUICC 100, the profile creating object 200, and the profile loading object 300. Moreover, it may be required to make a trust group among the eUICC 100, the MNO 400, and the profile loading object 300. That is, according to the embodiment of the invention, it is possible to make a trust group among a variety of objects and there are no specific limitations on objects that can make a trust group.

Further, a secure link among objects may be required. For example, the eUICC 100 may set secure links with the MNO 400 and the profile creating object 200. The profile creating object 200 may set secure links with the eUICC 100, the profile loading object 300, and the MNO 400. The profile loading object 300 may set secure links with the profile creating object 200, the MNO 400, and an eUICC manufacturer 500. The MNO 400 may set secure links with the eUICC 100, the profile creating object 200, and the profile loading object 300. According to the embodiment of the invention, the secure link may be set with a combination of a variety of objects and there are no specific limitations on the combination with which to set the secure link.

Figure 2:
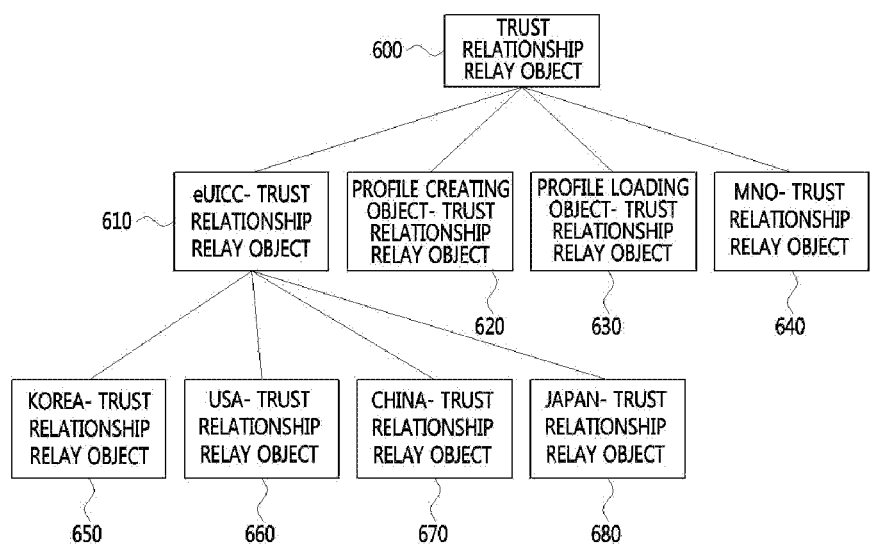
FIG. 2 is a diagram illustrating an exemplary hierarchical structure of a trust relationship relay object according to an embodiment of the invention.

FIG. 2 is a diagram illustrating an exemplary hierarchical structure of the trust relationship relay object 600 according to the embodiment of the invention.

As illustrated in FIG. 2, the trust relationship relay object 600 may be operated by a variety of methods.

More specifically, the trust relationship relay object 600 may be operated by each component that configures the eUICC 100 environment. For example, the trust relationship relay object 600 may be operated by the eUICC 100, the profile creating object 200, the profile loading object 300, and the MNO 400 which configure the environment that uses the eUICC 100, each of which may be named as an eUICC-trust relationship relay object 610, a profile creating object-trust relationship relay object 620, a profile loading object-trust relationship relay object 630, and an MNO-trust relationship relay object 640.

Furthermore, the trust relationship relay object 600 may be operated by each country. For example, the trust relationship relay object 600 may be operated by each of Korea, USA, China, and Japan, and named a Korea-trust relationship relay object 650, a USA-trust relationship relay object 660, a China-trust relationship relay object 670, and a Japan-trust relationship relay object 680.

The trust relationship relay object 600 may be operated by the hierarchical structure in FIG. 2.

Accordingly, the trust relationship relay object 600 may register and manage the trust information which configures the eUICC 100 environment by component or by country.

Figure 3:
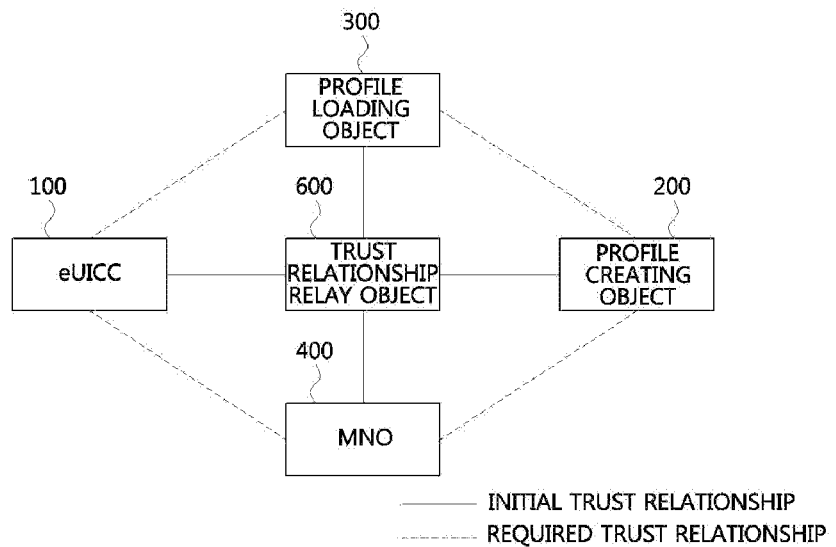
FIG. 3 is a conceptual diagram illustrating an initial trust relationship and a required trust relationship to describe trust relationship building according to the embodiment of the invention.

FIG. 3 is a conceptual diagram illustrating an initial trust relationship and a required trust relationship to describe trust relationship building according to the embodiment of the invention.

As illustrated in FIG. 3, a variety of trust relationships may be built in the eUICC 100 environment. First, the trust relationship relay object 600 may enable the building of initial trust relationships with the eUICC 100, the profile creating object 200, the profile loading object 300, and the MNO 400.

According to the invention, each component may make a flexible trust group using authentication information and trust information issued by the trust relationship relay object 600.

All components have their own authentication information capable of authenticating themselves, and corresponding trust information may be held by the trust relationship relay object 600. That is, the trust relationship relay object 600 is an object that relays a trust relationship among a plurality of objects such that an initial trust relationship can be built with other objects.

Originating from the initial trust relationship based on the trust relationship relay object 600, a required trust relationship may be set. That is, the eUICC 100 may build trust relationships with the profile loading object 300 and the MNO 400, and the profile creating object 200 may build trust relationships with the profile loading object 300 and the MNO 400. The profile loading object 300 may build trust relationships with the eUICC 100 and the MNO 400, and the MNO 400 may build trust relationships with the eUICC 100 and the profile creating object 200. The trust relationships may be built based on authentication information and trust information.

More specifically, each component may not initially have a trust relationship with another component. When the trust relationship with another component is required according to performing a function required for each component, the component requests trust information of a corresponding component from the trust relationship relay object 600 and receives the information, thereby making and updating the trust relationship. Furthermore, it is possible to make a trust group by making these trust relationships.

In the method of building a trust relationship, the object may be divided into a trust requesting object 10 that requests a trust relationship and a trust verifying object 20 with which a trust relationship is requested.

The method of building a trust relationship between the trust requesting object 10 and the trust verifying object 20 according to the embodiment of the invention will be described below in detail.

Figure 4:
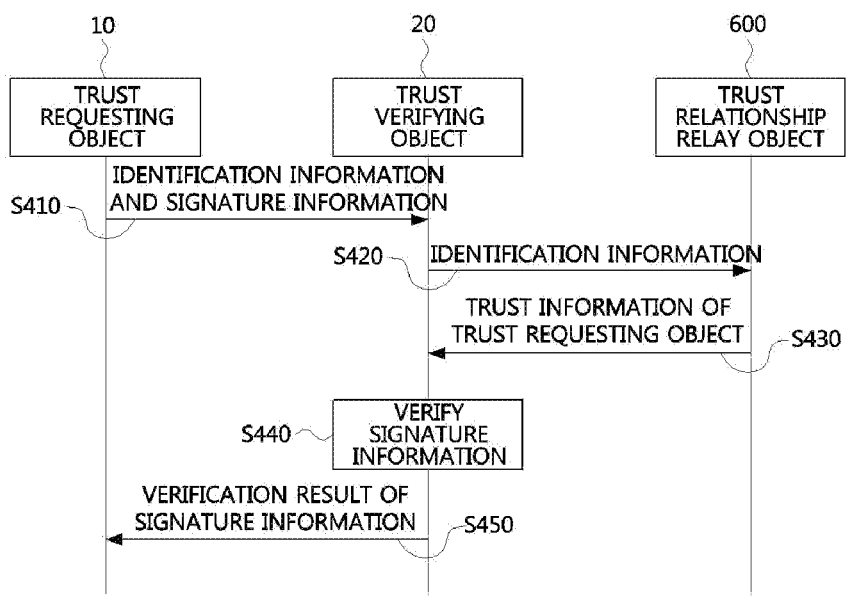
FIG. 4 is a sequence diagram illustrating a method of building a trust relationship according to the embodiment of the invention.

FIG. 4 is a sequence diagram illustrating the method of building a trust relationship according to the embodiment of the invention.

As illustrated in FIG. 4, the trust relationship according to the embodiment of the invention may be made using authentication information and trust information.

The trust requesting object 10 may transmit a trust relationship requesting message including identification information and signature information of the trust requesting object 10 to the trust verifying object 20 (S410). That is, the trust requesting object 10 may sign and seal its signature on the trust relationship requesting message and transmit the message to the trust verifying object 20.

The trust verifying object 20 delivers the trust relationship requesting message to the trust relationship relay object 600 so that the trust information of the trust requesting object 10 corresponding to the trust relationship requesting message may be received from the trust relationship relay object 600 (S430). For example, the trust verifying object 20 may transmit the identification information of the trust requesting object 10 to the trust relationship relay object 600 (S420), and receive that trust information corresponding to the identification information of the trust requesting object 10 (S430).

The trust verifying object 20 may verify the signature information of the trust requesting object 10 using the trust information of the trust requesting object 10 (S440). That is, the trust verifying object 20 may verify the signature of the received trust relationship requesting message and retrieve required information from the trust relationship relay object 600. In this case, as a method of verifying the signature, public-key encryption may be used.

The trust verifying object 20 may transmit a verification result of the signature information of the trust requesting object 10 to the trust requesting object 10 (S450). That is, the trust verifying object 20 may deliver the verification result including success or failure of the trust relationship building to the trust requesting object 10.

The trust requesting object 10 is an object that requests a trust relationship among components in the eUICC 100 environment, and the trust verifying object 20 is an object that is requested to be the trust relationship among components in the eUICC 100 environment. For example, the trust requesting object 10 may be the eUICC 100, the profile creating object 200, the profile loading object 300, or the MNO 400. Similarly, the trust verifying object 20 may be the eUICC 100, the profile creating object 200, the profile loading object 300, or the MNO 400.

Figure 5:
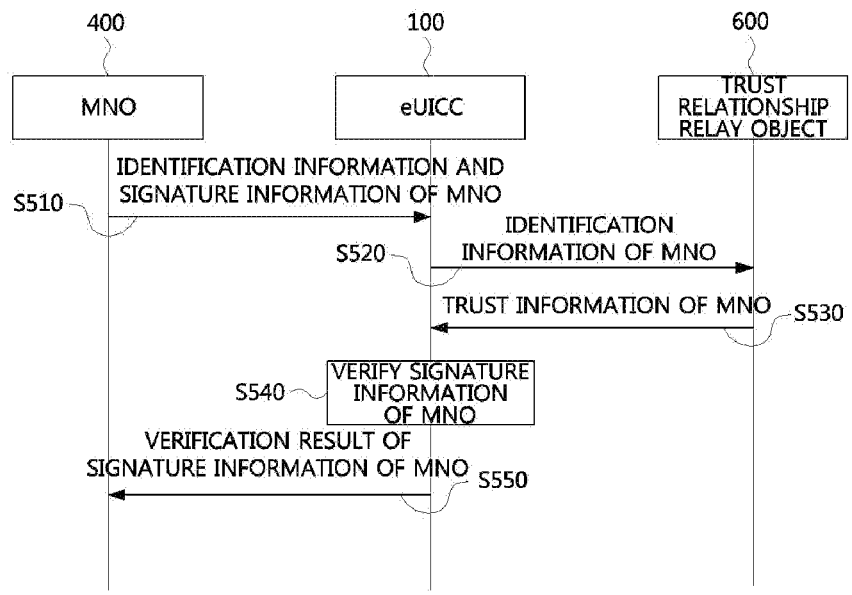
FIG. 5 is a sequence diagram illustrating in further detail a method of building a trust relationship according to the embodiment of the invention.

FIG. 5 is a sequence diagram illustrating in further detail the method of building the trust relationship according to the embodiment of the invention.

As illustrated in FIG. 5, the MNO 400 is the trust requesting object 10, and the eUICC 100 is the trust verifying object 20.

The MNO 400 may transmit a trust relationship requesting message including identification information and signature information of the MNO 400 to the eUICC 100 (S510). That is, the MNO 400 may sign and seal its signature on the trust relationship requesting message and transmit the message to the eUICC 100.

The eUICC 100 delivers the trust relationship requesting message to the trust relationship relay object 600 so that trust information of the MNO 400 corresponding to the trust relationship requesting message may be received from the trust relationship relay object 600 (S530). For example, the eUICC 100 may transmit the identification information of the MNO 400 to the trust relationship relay object 600 (S520), and receive trust information of the MNO 400 corresponding to the identification information of the MNO 400 (S530).

The eUICC 100 may verify the signature information of the MNO 400 using the trust information of the MNO 400 (S540). That is, the eUICC 100 may verify the signature of the received trust relationship requesting message and retrieve required information from the trust relationship relay object 600.

The eUICC 100 may transmit a verification result of the signature information of the MNO 400 to the MNO 400

(S550). That is, the eUICC 100 may deliver the verification result including success or failure of the trust relationship building to the MNO 400.

Figure 6:
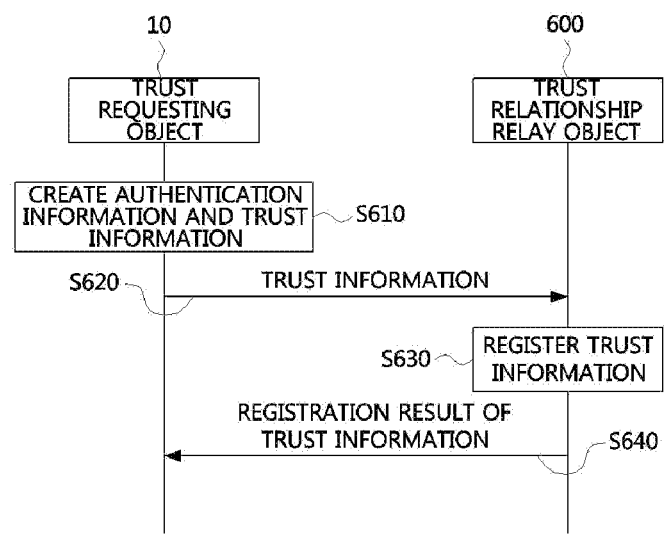
FIG. 6 is a sequence diagram illustrating creation and processing of authentication information and trust information according to the embodiment of the invention.

FIG. 6 is a sequence diagram illustrating creation and processing of authentication information and trust information according to the embodiment of the invention. FIG. 7 is a sequence diagram illustrating creation and processing of authentication information and trust information according to another embodiment of the invention. FIG. 8 is a sequence diagram illustrating creation and processing of authentication information and trust information according to still another embodiment of the invention.

Each component holds its own authentication information to make a unidirectional or bidirectional trust relationship with another component. It is possible to build and update the trust relationship (unidirectional or bidirectional) with another component using this authentication information.

More specifically, the object that wants to build a trust relationship may create a signature using the authentication information and deliver the signature to another object. The object that has received the signature may build the trust relationship by verifying the signature using trust information.

For this purpose, it is necessary to create authentication information and trust information.

According to the embodiment, as illustrated in FIG. 6, the trust requesting object 10 may directly create authentication information and trust information, and register the information in the trust relationship relay object 600.

The trust requesting object 10 (for example, eUICC 100) may create authentication information and trust information in addition to information that can identify the object (S610).

The trust requesting object 10 may transmit the trust information to the trust relationship relay object 600 (S620).

The trust relationship relay object 600 that has received the trust information may register the trust information (S630).

Finally, the trust relationship relay object 600 may respond to a registration result of the trust information (S640), and may deliver the registered trust information to the trust requesting object 10.

According to another embodiment of the invention, as illustrated in FIG. 7, the trust requesting object 10 may use the trust relationship relay object 600 to issue authentication information and trust information.

The trust requesting object 10 may request the trust relationship relay object 600 to create authentication information and trust information (S710). For example, the trust requesting object 10 may deliver identification information of the trust requesting object 10 to the trust relationship relay object 600 and request to create authentication information and trust information.

The trust relationship relay object 600 may create authentication information and trust information based on the identification information of the trust requesting object 10 (S720). Moreover, the trust relationship relay object 600 may register the trust information (S730).

Finally, the trust relationship relay object 600 may deliver the created authentication information and trust information to the trust requesting object 10 (S740).

According to still another embodiment of the invention, as illustrated in FIG. 8, it is possible to create authentication information and trust information using a relay through a trust managing object 40.

That is, the trust managing object 40 may alternatively create authentication information and trust information of the trust requesting object 10.

The trust managing object 40 may receive a request for creating authentication information and trust information from the trust requesting object 10 that wants to issue authentication information and trust information (S810), and deliver the request to the trust relationship relay object 600 (S820). In this case, the request for creating authentication information and trust information may be performed based on the identification information of the trust requesting object 10.

The trust relationship relay object 600 that has received the request for creating authentication information and trust information from the trust managing object 40 may create authentication information and trust information of the trust requesting object 10 (S830), and register the created trust information (S840).

The trust relationship relay object 600 may deliver the created authentication information and trust information to the trust managing object 40 (S850), and the trust managing object 40 that has received the authentication information and trust information may deliver the authentication information and trust information to the trust requesting object 10.

That is, the trust relationship relay object 600 may create authentication information and trust information, and the trust managing object 40 may deliver the authentication information and trust information created by the trust relationship relay object 600 to the trust requesting object 10.

The methods of creating authentication information and trust information in FIGS. 6 to 8 are not limited to a process of creating authentication information and trust information but may be used in a process of updating authentication information and trust information.

For example, in order to create authentication information and trust information, it is possible to use unique identification information of the eUICC 100, an eUICCID. Moreover, in order to create authentication information and trust information, it is possible to utilize at least one of a eUICC Manufacturer, a certificate authority (CA), and an ExpirationDate. The eUICCID refers to a unique identifier of the eUICC 100, the eUICC Manufacturer refers to information on the manufacturer of the eUICC 100, the CA refers to information on the trust relationship relay object 600, and the ExpirationDate refers to an expiration date.

FIG. 9 is a sequence diagram illustrating a method of building a secure link according to the embodiment of the invention.

As illustrated in FIG. 9, the method of building the secure link using authentication information and trust information will be described.

The method of building the secure link according to the embodiment of the invention provides a safe communication method between objects using the authentication information and trust information. That is, the secure link may be built through encryption using trust information of a data receiver, decryption using authentication information of the receiver, and a signature verifying use of trust information of a sender.

A sending object 50 is an object that requests building of a secure link among components in the eUICC 100 environment. A receiving object 60 is an object that is requested to build a secure link among components in the eUICC 100 environment. For example, the sending object 50 may be the eUICC 100, the profile creating object 200, the profile loading object 300, or the MNO 400. Similarly, the receiving object 60 may be the eUICC 100, the profile creating object 200, the profile loading object 300, or the MNO 400.

The sending object 50 may create a sending message which is encrypted using trust information of the receiving object 60, and to which signature information of the sending object 50 is added (S920). The created sending message may be delivered to the receiving object 60 (S930). The trust information of the receiving object 60 may be delivered from the trust relationship relay object 600 to the sending object 50 (S910).

The receiving object 60 may request trust information of the sending object 50 from the trust relationship relay object 600 and receive the information (S940).

The receiving object 60 may verify the signature information of the sending object 50 included in the sending message using the trust information of the sending object 50 (S950).

Finally, the receiving object 60 may decrypt the verified sending message using authentication information of the receiving object 60 (S960).

In the method of building the secure link according to the embodiment of the invention, data to be sent is encrypted using the trust information of the receiving object 60 and a signature is performed using the authentication information in order to identify the data to be sent. With such a method, it is possible for only the receiving object 60 to decrypt corresponding data, and it is possible to identify the sending object 50 so that the secure link may be built.

The sending object 50 may create a sending message which is encrypted using the trust information of the receiving object 60. A signature may be performed on the sending message using the authentication information of the sending object 50. The sending object 50 which delivers the sending message may not view contents due to the encrypted sending message, and may not modify contents due to the signature.

More specifically, operations of the sending object 50 are given below.

The sending object 50 creates a sending message. When the sending object 50 does not have trust information of the receiving object 60, the sending object 50 may request the trust information of the receiving object 60 from the trust relationship relay object 600 and receive the information.

The sending object 50 encrypts the sending message using the trust information of the receiving object 60 and signs on the sending message using the authentication information of the sending object 50.

The sending object 50 may deliver the encrypted and signed sending message to the receiving object 60.

Next, operations of the receiving object 60 are given below.

The receiving object 60 receives the encrypted and signed sending message from the sending object 50. When the receiving object 60 does not have trust information of the sending object 50, the receiving object 60 may request the trust information of the sending object 50 from the trust relationship relay object 600 and receive the information.

The receiving object 60 may verify the signature of the received sending message using the trust information of the sending object 50. When the signature of the sending object 50 is correct, the receiving object 60 may decrypt the sending message using the authentication information of the receiving object 60.

The method of building the secure link in FIG. 9 is described below using simple symbols.

$S[\ ]^A$ represents an operation of performing a signature, and the signature is performed using A information. $V[\ ]^A$ represents an operation of verifying the signature, and the signature is verified using the A information.

Meanwhile, $E[\ ]^A$ represents an operation of encrypting, and the encryption is performed using the A information. $D[\ ]^A$ represents an operation of decrypting, and the decryption is performed using the A information.

The sending object 50 performs $S[E[\ ]^{trust\ information\ of\ the\ receiving\ object}]^{authentication\ information\ of\ the\ sending\ object}$ in order to send the sending message. The receiving object 60 receives the sending message and performs $V[D[\ ]^{authentication\ information\ of\ the\ receiving\ object}]^{trust\ information\ of\ the\ sending\ object}$.

FIG. 10 is a sequence diagram illustrating in further detail the method of building the secure link according to the embodiment of the invention.

As illustrated in FIG. 10, a process of delivering a profile created by the profile creating object 200 to the eUICC 100 will be described. In this case, the sending object 50 is the profile creating object 200, and the receiving object 60 is the eUICC 100.

The profile creating object 200 may create a profile which is encrypted using the trust information of the eUICC 100, and to which the signature information of the profile creating object 200 is added (S1020). The created profile may be delivered to the eUICC 100 (S1030). The trust information of the eUICC 100 may be delivered from the trust relationship relay object 600 to the profile creating object 200 (S1010).

The eUICC 100 may request trust information of the profile creating object 200 from the trust relationship relay object 600 and receive the information (S1040).

The eUICC 100 may verify the signature information of the profile creating object 200 included in the profile using the trust information of the profile creating object 200 (S1050).

Finally, the eUICC 100 may decrypt the verified profile using the authentication information of the eUICC 100 (S1060).

The profile creating object 200 may create a profile which is encrypted using the trust information of the eUICC 100. A signature is performed on the profile using the authentication information of the profile creating object 200. Therefore, the profile creating object 200 that delivers the profile may not view contents due to the encrypted profile and may not modify contents due to the signature.

More specifically, operations performed by the profile creating object 200 are given below.

The profile creating object 200 creates a profile. When the profile creating object 200 does not have trust information of the eUICC 100, the profile creating object 200 may request the trust information of the eUICC 100 from the trust relationship relay object 600 and receive the information.

The profile creating object 200 encrypts the profile using the trust information of the eUICC 100 and signs on the profile using the authentication information of the profile creating object 200.

The profile creating object 200 may deliver the encrypted and signed profile to the eUICC 100.

Next, operations of the eUICC 100 are given below.

The eUICC 100 receives the encrypted and signed profile from the profile creating object 200. When the eUICC 100 does not have trust information of the profile creating object 200, the eUICC 100 may request the trust information of the profile creating object 200 from the trust relationship relay object 600 and receive the information.

The eUICC 100 may verify the signature of the received profile using the trust information of the profile creating object 200. Therefore, when the signature of the profile creating object 200 is correct, the profile may be decrypted using the authentication information of the eUICC 100.

Figure 11:
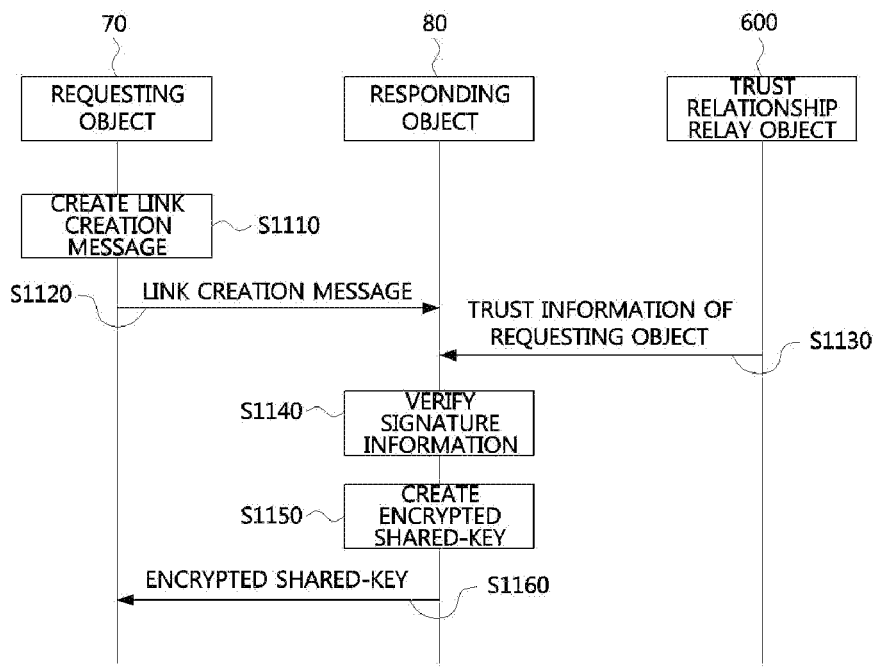
FIG. 11 is a sequence diagram illustrating a method of building a secure link according to another embodiment of the invention.

FIG. 11 is a sequence diagram illustrating a method of building a secure link according to another embodiment of the invention.

As illustrated in FIG. 11, the method of building the secure link between adjacent components according to the embodiment of the invention will be described. That is, when communication is performed between components configuring the eUICC 100 environment, a method in which the communication is encrypted and decrypted using a shared key between the components may be used.

Otherwise, when there is no shared key, a process of creating a shared key may be performed. The process of creating the shared key may use the methods of building the secure link proposed in FIGS. 8 to 10 to create and deliver the shared key.

The requesting object 70 is an object that requests building of a secure link among adjacent components in the eUICC environment and the responding object 80 is an object that is requested to build a secure link among adjacent components in the eUICC environment. For example, the requesting object 70 may be the eUICC 100, the profile creating object 200, the profile loading object 300, or the MNO 400. Similarly, the responding object 80 may be the eUICC 100, the profile creating object 200, the profile loading object 300, or the MNO 400.

The requesting object 70 may create a link creation message including signature information based on authentication information of the requesting object 70 (S1110), and deliver the created link creation message to the responding object 80 (S1120).

The responding object 80 may receive trust information of the requesting object 70 from the trust relationship relay object 600 (S1130). The requesting object 70 may verify the link creation message including signature information based on the authentication information of the requesting object 70 using the trust information of the received requesting object 70 (S 1140).

The responding object 80 may create an encrypted shared-key using the trust information of the requesting object 70 (S1150) and deliver the encrypted shared-key to the requesting object 70 (S1160). In this case, the encrypted shared-key may be a session key for communication between the requesting object 70 and the responding object 80.

More specifically, operations of the requesting object 70 are given below.

The requesting object 70 creates a link creation message. The authentication information of the requesting object 70 may be signed on the link creation message. The requesting object 70 may transmit the link creation message to the responding object 80. The requesting object 70 may receive the encrypted shared-key from the responding object 80 and apply the shared key as a session key for communication between the two objects.

Next, operations of the responding object 80 are given below.

The responding object 80 receives the link creation message from the requesting object 70. The responding object 80 may verify the signature of the link creation message using the trust information of the requesting object 70. The responding object 80 may create an encrypted shared-key using the trust information of the requesting object 70 and deliver the key to the requesting object 70.

Figure 12:
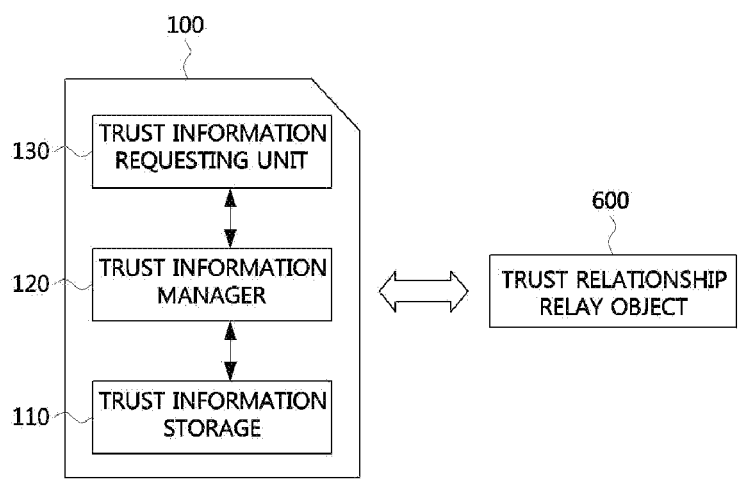
FIG. 12 is a block diagram illustrating a structure of the eUICC that builds a security-based environment which uses the eUICC according to the embodiment of the invention.

FIG. 12 is a block diagram illustrating a structure of the eUICC 100 that builds a security-based environment which uses the eUICC 100 according to the embodiment of the invention.

In order to build the trust relationship and secure link according to the embodiment of the invention described above, a variety of components (for example, the profile creating object 200, the profile loading object 300, and the MNO 400), in addition to the eUICC 100, need to check trust information of an associated component. This trust information may be obtained by requesting the information from the trust relationship relay object 600.

However, it is inefficient to request trust information of the same component from the trust relationship relay object 600 several times. Therefore, it is possible to store trust information in an internal storage of the eUICC 100.

For example, before requesting specific trust information from the trust relationship relay object 600, the eUICC 100 may check whether corresponding information is present in the internal storage of the eUICC 100. That is, when desired trust information is not present, it is possible to request the information from the trust relationship relay object 600.

As illustrated in FIG. 12, the eUICC 100 according to the embodiment of the invention includes a trust information storage 110, a trust information requesting unit 130 and a trust information manager 120.

The trust information storage 110 may store trust information of at least one object.

The trust information requesting unit 130 may query trust information based on identification information of at least one object.

The trust information manager 120 may search for trust information corresponding to identification information of at least one object in the trust information storage 110 in response to a request from the trust information requesting unit 130. That is, the trust information manager 120 may delete or update the trust information of at least one object stored in the trust information storage 110.

For example, when the trust information manager 120 does not retrieve the trust information corresponding to the identification information of at least one object from the trust information storage 110, it is possible to request the trust information corresponding to the identification information of at least one object from the trust relationship relay object 600 and receive the information.

Further, the trust information manager 120 may deliver trust information corresponding to identification information of at least one object, which is received from the trust relationship relay object 600, to the trust information storage 110.

More specifically, the trust information manager 120 queries the trust relationship relay object 600 about trust information and stores the trust information that has been queried and received in the trust information storage 110.

In order to operate efficiently, before the trust relationship relay object 600 is queried about trust information, the trust information manager 120 may query whether desired trust information is present in the trust information storage 110. When the desired trust information is present, querying with the trust relationship relay object 600 may not be performed. The trust information manager 120 may have a function of deleting trust information when the trust information expires, and deleting unused trust information when a capacity is exceeded.

The trust information storage 110 may store trust information that has been queried and received from the trust relationship relay object 600.

A procedure of searching for trust information in the eUICC 100 is described below.

The trust information requesting unit 130 may request a query about trust information using identification information of at least one object from the trust information manager 120.

The trust information manager 120 may search for trust information in the trust information storage 110 using identification information of at least one object.

When corresponding trust information is present, the trust information storage 110 may deliver the trust information to the trust information manager 120.

When the corresponding trust information is not present in the trust information storage 110, the trust information manager 120 may request a query about the trust information from the trust relationship relay object 600 using identification information of at least one object. The trust relationship relay object 600 may deliver the corresponding trust information to the trust information manager 120.

The trust information manager 120 may deliver the corresponding trust information to the trust information requesting unit 130. When the trust information is obtained through the trust relationship relay object 600, the corresponding trust information, in addition to the identification information of at least one object, may be stored in the trust information storage 110.

For example, the eUICC 100 receives a profile created in the profile creating object 200 through the profile loading object 300. In order to check a signature of the profile, authentication information of the profile creating object 200 may be required.

Since it is inefficient to request authentication information from the trust relationship relay object 600 whenever authentication information of a component, for example, the profile creating object 200, is required, the eUICC 100 may make a cache for authentication information. When authentication information is required to check, for example, a signature, the eUICC 100 checks cache information. Only when the cache information is not present may the eUICC 100 receive authentication information from the trust relationship relay object 600.

When the authentication information is present in the cache, the authentication information is not requested from the trust relationship relay object 600 and the signature may be checked using present authentication information.

According to the above-described embodiments of the invention, it is possible to securely support a function provided in an existing UICC environment and provide an equal or higher level of security than the existing UICC environment. Furthermore, it is possible to expect a flexible authentication structure between components by building a trust relationship using authentication information.

In addition, it is possible to create a secure end-to-end link of components using a secure link building method that uses authentication information and trust information. Accordingly, it is possible to maintain a high level of security even if a configuration of the environment that uses the eUICC 100 changes.

Moreover, in order to operate efficiently, it is possible for a variety of components (for example, the profile creating object 200, the profile loading object 300, and the MNO 400) including the eUICC 100 to efficiently utilize trust information of an associated component, by proposing an additional function for the eUICC 100.

While the present invention has been particularly described with reference to exemplary embodiments, it will be understood by those skilled in the art that various changes in form and details may be made without departing from the spirit and scope of the present invention. Therefore, the exemplary embodiments should be considered in a descriptive sense only and not for purposes of limitation. The scope of the invention is defined not by the detailed description of the invention but by the appended claims, and encompasses all modifications and equivalents that fall within the scope of the appended claims.

What is claimed is:

1. A method of building a trust relationship in an eUICC environment, comprising:
    transmitting, by a trust requesting object, a trust relationship requesting message including identification information and signature information of the trust requesting object to a trust verifying object;
    delivering, by the trust verifying object, the trust relationship requesting message to a trust relationship relay object and receiving trust information of the trust requesting object corresponding to the trust relationship requesting message from the trust relationship relay object; and
    verifying, by the trust verifying object, the signature information of the trust requesting object using the trust information of the trust requesting object,
    wherein, in the receiving, the trust verifying object receives trust information of the trust requesting object corresponding to the trust relationship requesting message from the trust relationship relay object in response to the trust information of the trust requesting object not being found in the trust verifying object, and
    wherein the trust requesting object creates authentication information and the trust information of the trust requesting object based on eUICC identification information and transmits the trust information and the authentication information to the trust relationship relay object.

2. The method of claim 1, further comprising transmitting, by the trust verifying object, a verification result of the signature information of the trust requesting object to the trust requesting object.

3. The method of claim 1, wherein the trust requesting object is an eUICC and the trust verifying object is a mobile network operator (MNO).

4. The method of claim 1, wherein the trust requesting object and the trust verifying object are each any one of an eUICC, an MNO, a profile creating object, and a profile loading object.

5. The method of claim 1, wherein the trust relationship relay object is a certificate authority (CA).

6. A method of building a secure link in an eUICC environment, comprising:
    transmitting, by a sending object, a sending message, which is encrypted using trust information of a receiving object and to which signature information of the sending object is added, to the receiving object;
    verifying, by the receiving object, the signature information of the sending object included in the sending message using trust information of the sending object; and
    decrypting, by the receiving object, the verified sending message using authentication information of the receiving object,
    wherein, in the verifying, the receiving object requests the trust information of the sending object from a trust relationship relay object in response to the trust information of the sending object not being found in the receiving object, and
    wherein, in the verifying of the signature information of the sending object, the receiving object requests trust information of the sending object created based on eUICC identification information from the trust relationship relay object and receives the information.

7. The method of claim 6, wherein the sending object is a profile creating object and the receiving object is an eUICC.

8. The method of claim 6, wherein, in the transmitting of the sending message to the receiving object, the sending object requests trust information of the receiving object from the trust relationship relay object and receives the information.

9. A method of building a secure link in an eUICC environment, comprising:
    transmitting, by a requesting object, a link creation message including signature information based on authentication information of the requesting object to a responding object;

verifying, by the responding object, the signature information based on the authentication information of the requesting object using trust information of the requesting object; and delivering, by the responding object, an encrypted shared-key created using the trust information of the requesting object to the responding object, wherein, in the verifying, the responding object requests the trust information of the requesting object from a trust relationship relay object in response to the trust information of the requesting object not being found in the responding object, wherein the requesting object creates the authentication information and the trust information of the requesting object based on eUICC identification information and transmits the trust information and the authentication information to a relay object.

10. The method of claim 9, wherein the requesting object and the responding object are any one of an eUICC, an MNO, a profile creating object, and a profile loading object.

11. The method of claim 9, wherein the encrypted shared-key is a session key for communication between the requesting object and the responding object.

12. The method of claim 9, wherein the trust information of the requesting object is managed by a certificate authority.

13. An eUICC comprising:
a trust information storage configured to store trust information of at least one object;
at least one processor configured to execute:
a trust information requesting unit configured to query the trust information based on identification information of at least one object; and
a trust information manager configured to search for the trust information corresponding to the identification information of at least one object in the trust information storage in response to a request from the trust information requesting unit,
wherein the trust information manager requests the trust information corresponding to the identification information of at least one object from the trust relationship relay object in response to the trust information corresponding to the identification information of the at least one object not being found in the trust information storage, and
wherein the trust information manager receives the trust information created based on eUICC identification information corresponding to the at least one object from the trust relationship relay object.

14. The eUICC of claim 13, wherein the trust information manager deletes or updates the trust information of at least one object stored in the trust information storage.

15. The eUICC of claim 13, wherein the trust information manager delivers the trust information corresponding to the identification information of at least one object, which is received from the trust relationship relay object, to the trust information storage.

16. The method of claim 1, wherein the trust requesting object comprises a mobile device.

17. The method of claim 16, wherein the mobile device comprises an eUICC.

18. The method of claim 6, wherein, in the transmitting, the sending object requests the trust information of the receiving object from the trust relationship relay object in response to the trust information of the receiving object not being found in the sending object.

* * * * *